United States Patent [19]

Mushkin

[11] 4,120,115
[45] Oct. 17, 1978

[54] SWITCH

[76] Inventor: Nicholas M. Mushkin, 4755 E. Flamingo, Las Vegas, Nev. 89109

[21] Appl. No.: 757,989

[22] Filed: Jan. 10, 1977

[51] Int. Cl.² ............................................. A01M 3/02
[52] U.S. Cl. ........................................ 43/137; 15/207
[58] Field of Search ...................... 43/137; 15/189, 207

[56] References Cited

U.S. PATENT DOCUMENTS

| 161,870 | 4/1875 | Dorrison | 43/137 |
| 395,022 | 12/1888 | Wells | 43/137 |
| 1,070,630 | 8/1913 | Reeves | 15/207 X |

Primary Examiner—Louis G. Mancene
Assistant Examiner—Daniel J. Leach
Attorney, Agent, or Firm—Seiler & Quirk

[57] ABSTRACT

A device for killing insects comprises an elongated handle and a plurality of elongated flexible strands or filaments having one end secured to one end of the handle.

7 Claims, 2 Drawing Figures

FIGURE 1.

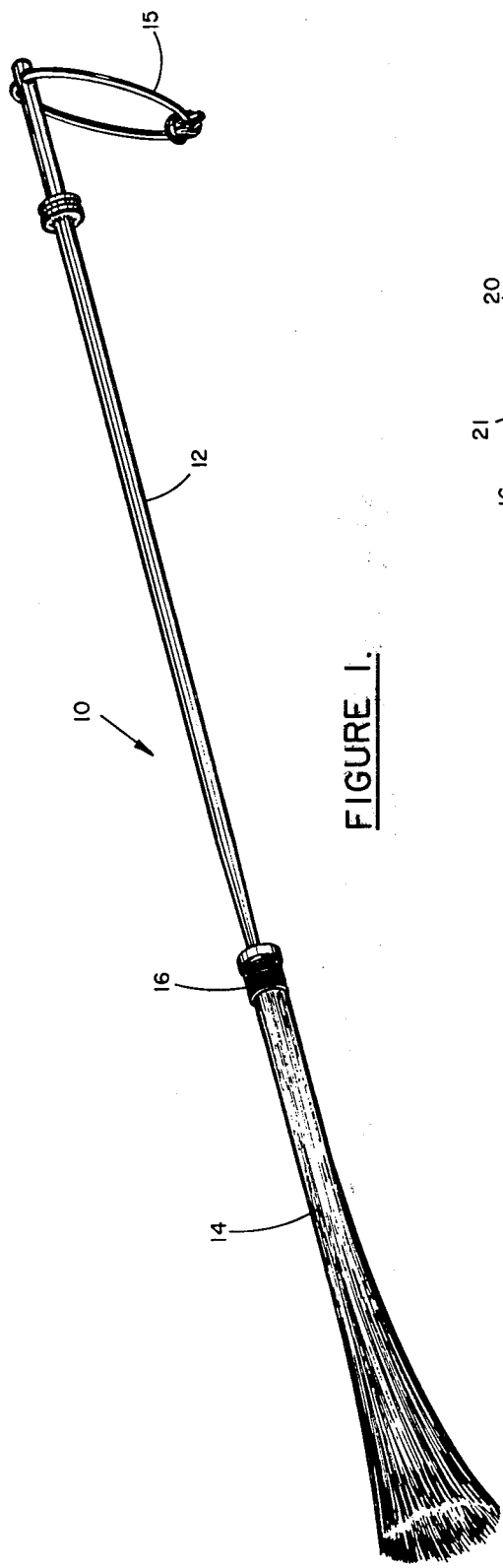
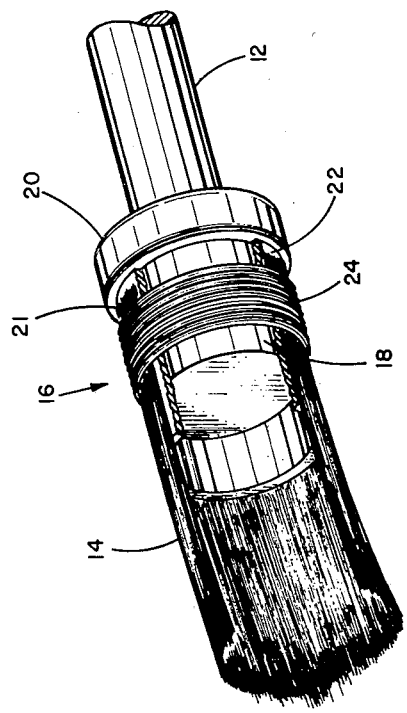
FIGURE 1.
FIGURE 2.

4,120,115

SWITCH

BACKGROUND OF THE INVENTION

Swatters, devices for killing insects, are well known to comprise fine-mesh wire netting, or a flat piece of perforated rubber or plastic, secured to an elongated handle. However, in utilizing such a device, it is often difficult, if not almost impossible, to successfully swat the insect, such as a fly, if it is settled in a difficult to reach area such as a relatively narrow space. Since the state of the art swatters are usually at least a few inches across the flat swatter surface, in order to be effective, the area in which the insect is located must be large enough to accommodate that swatter width. Moreover, even though the swatter heat is somewhat flexible, it is most difficult to kill the insect where there is not sufficient flat surface, such as where the insect is positioned on a corner or edge. Further, the flat sided swatters are most ineffective in killing insects in flight. It is to the elimination of the problems associated with successfully swatting and killing an insect with the state of the art fly swatter that the present invention is directed.

SUMMARY OF THE INVENTION

The device of the present invention comprises a switch which is easy to use, since the swatting portion, i.e., the head or end portion of the device which contacts and kills the insect, is made of a long, flexible strands. Moreover, the strands are arranged in a relatively narrow pattern so that they can reach into almost any location including narrow areas, and can successfully contact and kill an insect without regard to the shape of the surface on which the insect is located. The device is even effective when contacting insects in flight. The device is simple to produce and assemble, and which features will be understood from the following detailed description.

BRIEF DESCRIPTION OF THE DRAWINGS

FIG. 1 is a view of the switch of the invention; and

FIG. 2 is an enlarged and partially cut away view of the device to illustrate preferred attachment of the strands to the end of the handle.

DETAILED DESCRIPTION OF THE INVENTION

FIG. 1 shows the switch 10 comprising an elongated handle member 12 and a plurality of strands 14, secured to end 16 of the handle. The opposite handle end is for holding the device, and may have a strap 15 or other means for assisting in conveniently holding the device with one hand, although such a feature is entirely optional. The handle may be produced of any suitable material, wood, or plastic being preferred, because of availability as well as ease in shaping to the elongated shape as shown. However, other materials may also be used, including ebony, or even metal which may be solid or hollow, so long as the handle adequately supports the strands, and can be conveniently held in the hand. Again, a molded plastic handle preferably tubular shaped along the exterior surface, or shaped wood, or the like is preferred.

The strands may be of any suitable material, preferably of a plastic filament such as nylon, or the like, which is flexible, and having a thick hair-like character. Other synthetic strands may be used, so long as they are sufficiently flexible to easily conform to any surface shape contacted during use of the device. Thus, very slender and fine hair like strands may be too flimsy while strong or similar broom-like materials would be stiff or not usually flexible enough to achieve the desired purpose. Again, elongated nylon or other plastic filaments, or even animal hair such as horse tail hair, and the like, having a length of between about 6 and about 20 inches, and preferably between about 10 and about 16 inches, is preferred. The diameter of these strands, is preferably between about 5 and 10 mils, preferably between about 6 and about 8 mils, and more preferably between about 7 and about 7.5 mils, so as to give suitable flexibility. The length of the handle is preferably between about 10 and about 20 inches, with between about 14 and 18 inches being more preferred. Generally, the longer the handle, the greater the speed of the strands when using the switch resulting in increased force at the strand end when striking an insect. On the other hand, the shorter the handle, the greater the accuracy. A 16 inch handle is believed to provide optimum efficiency. This combination of strand and handle lengths result in a device which can be easily handled and used with significant accuracy for the intended purpose.

The strands are secured to the handle with elongated strand axes being substantially parallel at the point where they are secured to the handle end. It will be understood that the strands will not remain parallel along their entire length because of their flexibility, although they will normally lie gathered in a manner as illustrated in FIG. 1. The ends of the strands are also secured to the handle end so that they lie along an axis substantially parallel to the elongated handle axis as is illustrated in both FIGS. 1 and 2. The strand ends may be secured by any convenient means to the handle end. Thus, the strand ends may be directly tied to or secured against the handle end. For example, if a molded plastic handle is used, the strand ends could even be set in a molded handle end, or end cap, or tied therein. Alternatively, the strand ends could be placed in a resin molding vessel into which epoxy or similar curing resin is introduced, and after the resin has set, the resin block, in which the strand ends are fixed, is secured to the handle end. Further, a curable resin may be sprayed or otherwise applied to the strand ends held against the handle end, or ultrasonic welding means may be used.

It is preferred that a resilient separator member 22 be located between the handle end and the securing means. This feature is illustrated in FIG. 2, wherein a resilient member 22 is located around the circumferential exterior handle end surface 18, and with the strands ends 14 uniformly disposed around the plastic member. A length of wire 24 or other similar means is used for wrapping around the circumferential handle end area 16 to which the strand ends are secured. This wire or other similar securing means is tightly wrapped so as to force the strand ends against the resilient plastic member 22. Although this member is resilient, it should have a "memory" or recovery and resistance to being deformed so that it will tend to resist the force of the strands being compressed thereagainst by the wire. Without such a feature, the wire could eventually crush the strand ends against a very hard handle end surface, such as a metal or hard plastic, and the strand ends may then become broken, loosened, or otherwise easily removed from the handle. Thus, utilizing the somewhat resilient member around the entire handle end surface 18, regardless of the handle material itself, a sufficiently resilient surface against or onto which the strand ends are forced and wedged by the wrapped wire 24 or other similar means, will adequately secure the strand ends, without damaging them. This resilient member, when extending beyond the handle end as illustrated, will also act as a cushion and protect the strand ends during use, should the handle end strike a solid object, which could otherwise damage the strands. Again, other means of securing the strand ends against the resilient member may be used, such as clamps, resin application, etc., within the skill of the art.

The resilient member 22 may be any material which can be formed around the exterior handle end surface 18. Suitably flexible plastic materials include polyvinyl chloride, polyethylene, or flexible rubber or synthetic elastomer including ABS copolymers and the like may be used. As also shown, the plastic member 22 may abut against flange 20. The length to which resilient member 22 extends beyond the end of handle end portion 18, is not so important, so long as the plastic member is sufficiently disposed around the entire handle end circumference opposite the area in which wire 24 or other securing means is wrapped. Preferably, the handle end surface to which the strand ends are secured, will have a surface of revolution, such as that shown, rather than sharp edges, because of the ease in which strand ends can be uniformly disposed around the handle end as well as being secured by wrapping a wire 24 tightly therearound.

The extent to which the terminal ends 21 of the strands 14 extend beyond wire 24 is not important, so long as the strands are sufficiently held in the device. Preferably, the strand terminal ends 21 will extend to flange 20, with wire 24 being wrapped entirely down to the flange. However, that may not be necessary, again, so long as the strands are sufficiently tightly wrapped and held to the device so that they will not become easily removed, broken, or otherwise dislodged during use. The opposite strand ends may be cut rather evenly as illustrated or may be tapered so that the longer strands are in the center of the mass with shorter strands to the outside. Again, the switch of the invention is believed to be superior to state of the art swatters since its strands or filaments are not significantly slowed down by air resistance during movement of the strands through the air as are perforated plastic or rubber flat head swatters. These as well as other embodiments and advantages of the device, within the purview of the invention will be evident to those skilled in the art.

I claim:
1. A device for killing insects comprising:
an elongated handle, one end of which has a circumferential exterior surface, and a plurality of elongated flexible strands having one end secured to the circumferential end of said handle, said strand ends being disposed substantially uniformly around said circumferential handle end surface and secured by a length of wire circumferentially wrapped around said handle end, said strand ends lying between said wire and said handle end, and a resilient member disposed between said handle end surface and said strand ends, whereby said wire is wrapped to force said strand ends securely against said resilient member.
2. The device of claim 1 wherein said strand ends each lie along substantially parallel axes.
3. The device of claim 2 wherein said axes are substantially parallel to the axis along said handle.
4. The device of claim 1 wherein said resilient member comprises an elastomer or a plastic.
5. The device of claim 4 wherein said strands have a diameter between about 5 mils and 10 mils.
6. The device of claim 5 wherein said handle member is between about 10 and 20 inches long.
7. The device of claim 6 wherein said strands are between about 10 and 16 inches.

* * * * *